March 12, 1940.  M. Y. SEATON  2,193,570
METHOD OF DRYING FLUIDS
Filed July 22, 1939
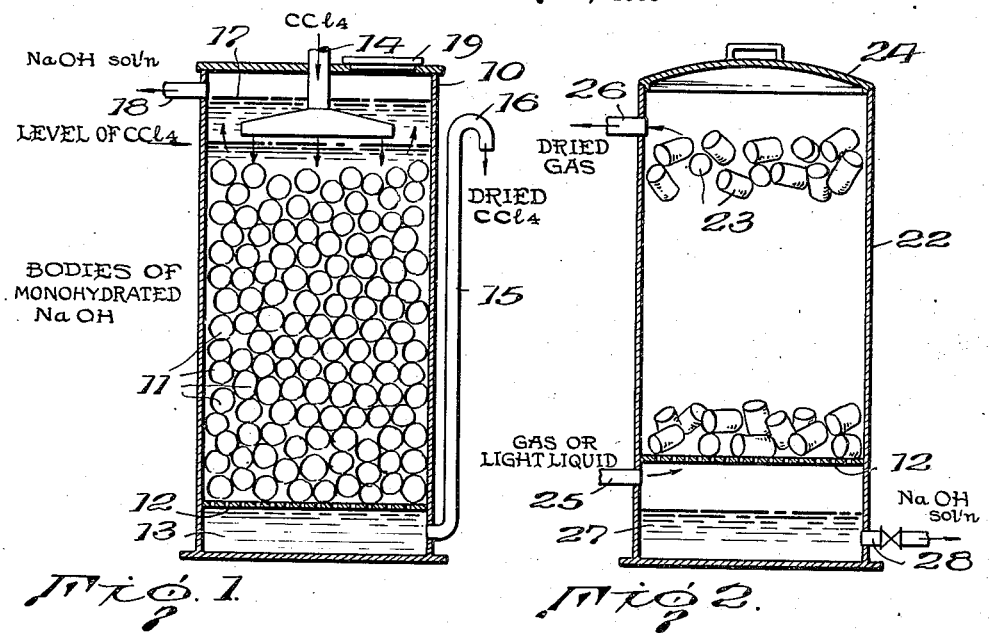
Fig. 1.
Fig. 2.
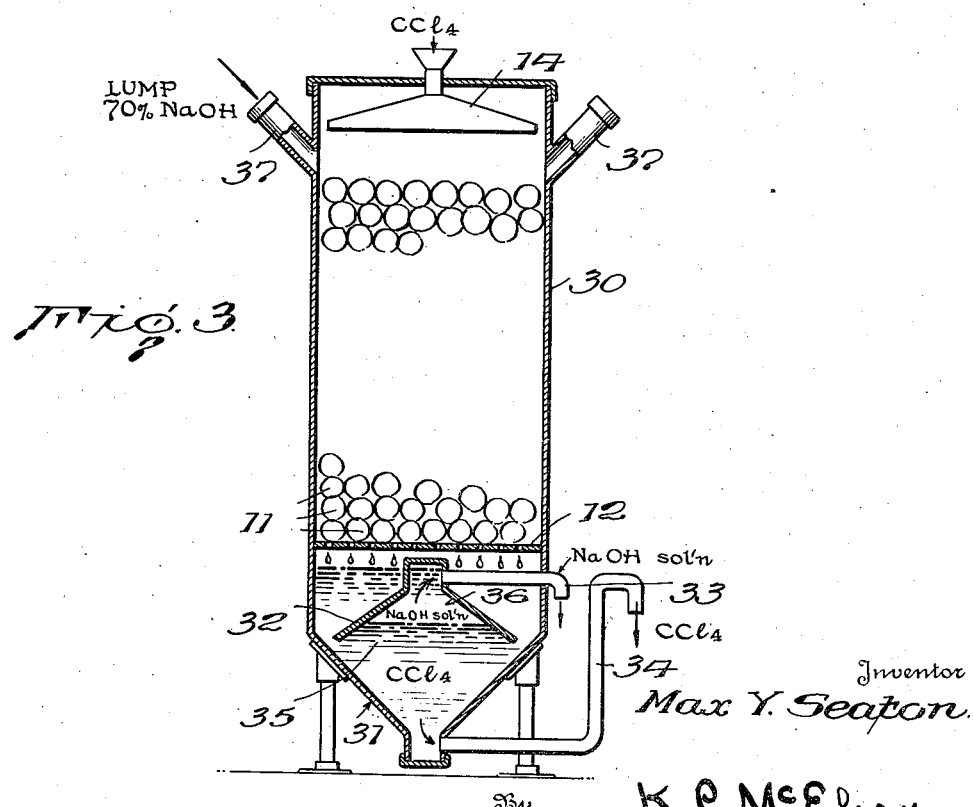
Fig. 3.
Inventor
Max Y. Seaton.
By K. P. McElroy
Attorney Patented Mar. 12, 1940

2,193,570

UNITED STATES PATENT OFFICE 2,193,570

METHOD OF DRYING FLUIDS

Max Y. Seaton, Greenwich, Conn., assignor to Westvaco Chlorine Products Corporation, New York, N. Y., a corporation of Delaware Application July 22, 1939, Serial No. 286,039

7 Claims. (Cl. 260—704)

This invention or discovery relates to methods of drying fluids; and it comprises a method of drying a moist fluid (liquid or gas) which is inert with respect to NaOH, including the step of passing the moist fluid past extensive surfaces of solid hydrated caustic soda corresponding approximately to $NaOH.H_2O$, advantageously in an elongated confined zone, and removing caustic liquor as formed, by gravitational action, to expose fresh surfaces of $NaOH.H_2O$ to the passing fluid; all as more fully hereinafter set forth and as claimed.

Caustic soda, NaOH, is theoretically an excellent drying agent in the sense that it is capable of withdrawing water quite completely from non-reactive gases and non-aqueous liquids in contact therewith. It is, however, difficult to utilize it as a drying agent in any practical way. Efficient drying of a flowing current of liquid or gas by any drying agent requires that extensive active surfaces be presented to the fluid flow throughout the operation. Anhydrous NaOH swells when it takes up water, and commercial forms of solid anhydrous NaOH such as sticks, flakes and balls tend to cake as they take up moisture, thereby reducing the permeability to fluid flow and at the same time reducing the exposure of active surface. One cubic centimeter of anhydrous NaOH swells to 1.7 cubic centimeters on taking up 30 per cent of water. Attempts have been made to utilize ordinary anhydrous NaOH for drying, but these have not met with much success in commercial operations. Ordinarily the NaOH reaches a practically useless physical condition, and must be discarded, long before its theoretical moisture-absorbing capacity has been reached.

I have found that caustic soda which is already partly satisfied with a certain amount of water, that is a hydrated form of caustic soda containing about 30 per cent $H_2O$ of crystallization, will reduce the partial pressure of $H_2O$ in gases to practically the same low point as anhydrous caustic, but presents great practical advantages in use in that the active surfaces are, so to speak, self-cleaning. The water taken up drips or drains away as a fluent soda solution of maximum concentration (at the drying temperature employed) and minimum vapor tension.

Commercial 70 per cent caustic, a solid material melting at about 65° C., correponds substantially to the mono-hydrate $NaOH.H_2O$ and is useful for the present purposes. It is commercially available in molten or semi-molten form, being often shipped in tank cars fitted with heating coils to permit melting and pumping.

In another and copending application, Serial No. 105,576, filed Oct. 14, 1936, for Methods of and apparatus for drying, wherewith the present application contains matter in common, I have described and claimed utilization of these properties of mono-hydrate by supporting the mono-hydrate in thin films or layers on solid bodies, such as Raschig rings. In that embodiment of my invention there are many practical advantages, among them being that of regeneration by running molten mono-hydrate down a tower containing packing materials such as Raschig rings. The excess of mono-hydrate drips away leaving the rings covered with a thin film. The melting temperature being around 70°, when the tower is cooled below this temperature, the liquid films on the supporting bodies solidify. The active surface of the mono-hydrate can thus be maintained substantially constant in area.

I have found that, in addition to using caustic soda mono-hydrate in the form of thin films or layers on suitable supports, as described in the acknowledged application, it also serves as an excellent drying material when in the form of other shaped bodies. Shaped bodies of the mono-hydrate which are suitable for the invention includes sticks, lumps, balls, blocks, octahedrons, hexahedrons, etc. Octahedral blocks tumbled into a tower in random arrangement give a large amount of caustic soda and at the same time provide extensive exposed surfaces and an easily permeable assemblage for passing fluid.

In use, the shaped bodies of caustic mono-hydrate are advantageously arranged as a permeable column in a tower or other suitable container. The bodies are conveniently supported on a foraminous base, with fluid space above and below the column. The conduit connections to the tower depend on the character of the fluid to be dried. If the material being dried is a heavy liquid, that is one having a specific gravity greater than that of strong caustic solutions (generally about 1.5) the liquid is conveniently introduced at the top of the column and is caused to pass down through the column past the mono-hydrate surfaces and out at the bottom. As the mono-hydrate surfaces take up water with liquefaction, the resulting caustic solution tends to rise through the heavier liquid, and may be conveniently drawn off at the top. The liquid being dried and the caustic solution formed thus move in countercurrent. It is desirable to have the tower sufficiently large in cross section to afford a reasonably slow linear rate of flow, so that the separation will take place readily. On the other hand, if the material being dried is a liquid lighter than the caustic solutions formed, or is a gas, it is introduced into the bottom of the tower and removed at the top. The caustic liquor as formed then drips or drains downward, and is removed from the base of the tower.

The described process is particularly useful in removing the last traces of water from carbon tetrachloride. Carbon tetrachloride is a heavy liquid, and is passed downwardly through the tower in a slow current and issues at the bottom in dried condition. Carbon tetrachloride is so dense that the desired separation between it and the spent caustic liquor takes place readily. In drying carbon tetrachloride or other chlorinated hyrocarbons, which often contain a little HCl, there is enough water in the liquefying mono-hydrated alkali to dissolve any salt (NaCl) which is formed by neutralization of the HCl; there is no glazing of the mono-hydrated caustic by a salt film, which sometimes causes difficulty in drying with anhydrous caustic. The invention is also useful in drying such light liquids as gasoline and petroleum oils; these being introduced at the bottom of a column of monohydrate for upward flow. And as stated, the invention is useful in drying all sorts of gases, provided only that they are inert to caustic soda. Air and hydrogen are two gases to which the invention can be applied with particular advantage. It has been found in practice that the mono-hydrate will reduce the partial pressure of $H_2O$ in gases further than is possible with calcium chloride and most of the other ordinary drying agents. In drying air, $CO_2$ is also removed but this does not complicate the described operation. The amount of $CO_2$ in ordinary air is very small compared to the moisture content, and there is enough water in the mono-hydrate to take care of sodium carbonate formed.

The mono-hydrate can be used in the form of bodies of any suitable shape, for example, spheres, cyclinders or rods. Irregular shapes can be employed. It is best to have the bodies all substantially the same size, as this gives maximum permeability. Bodies from ¼ inch to 2½ inches in average diameter are convenient, depending on the size of the drying unit. The mono-hydrated caustic has a melting point so low that it is a simple matter to form the mono-hydrate into suitable shapes, by extrusion methods or by casting.

In the coursee of operation of a tower filled with shaped bodies of mono-hydrate, the bodies tend to decrease in size, but there is little tendency to clump together as an impermeable mass because the surfaces of the bodies are always being renewed by withdrawal of the liquefied caustic. Mono-hydrated caustic does not swell much on taking up water, and any possible difficulty from swelling is obviated by liquefication of the surface layer as soon as water is absorbed. The charge in the tower is renewed from time to time by introducing more of the bodies.

The hydrated caustic soda employed need not be exactly the mono-hydrate (69 per cent NaOH and 31 per cent $H_2O$). Hydrated forms of caustic soda containing about 66 to 80 per cent NaOH and about 34 to 20 per cent water of crystallization are useful, and are included in the term "mono-hydrate" as sometimes used herein. These compounds have melting points of about 60 to 80° C; a value far below that of anhydrous caustic, which is 318° C. As stated, hydrated caustic soda having melting points in this range is readily fusible and can be formed into the desired shapes by very simple methods.

In the accompanying drawing, I have shown, more or less diagrammatically, three forms of apparatus useful in the performance of the described method. In the drawing, Fig. 1 shows in vertical section a form of apparatus useful in drying dense liquids;

Fig. 2 shows in vertical section a form of apparatus useful in drying light liquids and gases, and Fig. 3 shows in vertical section a modified form of apparatus useful in drying heavy liquids, such as carbon tetrachloride.

Referring to the drawing and in particular to Fig. 1, a casing 10 is provided of material resistant to caustic alkali and to the fluid being dried. A collection of shaped bodies 11 (shown as spheres) of substantially mono-hydrated NaOH is provided in the casing, supported on a foraminous plate 12 spaced above the casing bottom to leave a reservoir space 13. A heavy liquid to be dried, such as $CCl_4$, is introduced at the top through a distributor 14 and flows downwardly through the mono-hydrate bodies, becoming dried in the process. Dried $CCl_4$ is removed through a pipe 15, which advantageously has a bend 16 provided at such height as to maintain the mono-hydrate column submerged in $CCl_4$. As the surfaces of the monohydrate bodies liquefy, the solution at a density of about 1.5 finds its way upwardly through the column and floats on top of the $CCl_4$ at 17. The spent caustic is removed by a conduit 18 as shown. Separation is sharp and clean. The $CCl_4$ is not contaminated with NaOH, nor does the spent caustic liquor carry away $CCl_4$. The apparatus is recharged with mono-hydrate bodies from time to time through a manhole 19. Nickel-clad steel or other material resistant to caustic soda is advantageously employed in the construction of apparatus for practicing the invention.

Referring to Fig. 2, a casing 22 is provided having a foraminous plate 12 spaced above the bottom as in Fig. 1, and supporting a charge of monohydrate bodies 23, shown as cylinders. The casing has a detachable cover 24 for recharging. Gas or a light liquid to be dried is introduced near the bottom of the casing at 25, and diffuses upwardly through the column, becoming dried. The dried fluid is removed at 26. Liquefied caustic drips down and collects in the sump or reservoir part of the casing, as shown at 27. It is removed by a conduit 28.

At ordinary temperatures of operation, say 20° to 30° C., the specific gravity of the caustic liquor leaving the solid mono-hydrate is around 1.5, corresponding to a 50 per cent NaOH solution. At higher working temperatures than this, the NaOH becomes liquid enough to flow away at a somewhat higher concentration, and vice versa. In the case of any particular liquid to be dried, if its specific gravity is above about 1.5 the apparatus will be of the general type shown in Fig. 1; if below 1.5, the apparatus of Fig. 2 is employed. Liquids of markedly different density than that of the caustic liquor make possible higher flow rates than in the case of liquids of density differing but little from that of the spent caustic liquor. But the process operates satisfactorily with a surprisingly small density differential.

Fig. 3 shows another form of apparatus particularly suitable for drying carbon tetrachloride and other dense liquids. The apparatus of Fig. 3 is especially compact. The drying capacity, both as regards ultimate amount of moisture removed, and as regards the rate at which the liquid to be dried can be fed through the apparatus, is exceptionally high. As shown, a casing 30 is provided having a conical sump bottom 31, and a distributor 14 for CCl₄ at the top. The casing is partly filled with shapes of mono-hydrated NaOH (about 70 per cent NaOH) supported on a pervious grid 12 as in Fig. 1. In the lower portion of the casing is a collecting cone 32 with a discharge pipe 33 at its top. An outlet pipe 34 discharges from the sump bottom 31.

In operation, CCl₄ is introduced at 14 and caused to trickle down over the mono-hydrate spheres. Liquefied caustic likewise drains down as it forms. In the sump bottom the droplets of CCl₄ coalesce to form a body of CCl₄, indicated at 35, and the lighter droplets of NaOH solution rise and form a supernatant pool or body, indicated at 36. NaOH solution and CCl₄ are removed at 33 and 34 respectively. The top or highest part of outlet pipe 34 is arranged at such height as to maintain the desired liquid level, as shown. Fresh mono-hydrate lumps are introduced through tubes 37 as required.

In the apparatus of Fig. 3 the caustic bodies are not submerged in liquid. The CCl₄ tends to distribute itself filmwise over the lumps and excellent contact is assured.

In employing mono-hydrated caustic soda on supporting bodies, such as Raschig rings, recharging of the drying apparatus is carried out in a somewhat different manner. The rings are left permanently in the tower and when it is desired to recharge the tower, the rings are first steamed and then molten mono-hydrate is distributed over the rings and caused to solidify in place. This matter is described in detail in the acknowledged copending application.

Caustic potash may be used in the present invention in lieu of caustic soda, although it is not as efficient, pound for pound, because of the higher molecular weight. In using it a caustic potash liquor is brought to such a concentration that it will set on cooling and remain solid up to 60°–80° C., melting again at higher temperature. Mixtures of KOH and NaOH hydrates have interesting properties in this connection since for equivalent melting points, dehydration can be carried further and a lower vapor tension obtained while still making a material solid at 60°–80° C.

What I claim is:

1. In drying H₂O containing fluids which are substantially inert chemically with respect to caustic soda, the process which comprises bringing said fluid in contact with extensive surfaces of solid hydrated caustic soda containing 66 to 80 per cent NaOH and 34 to 20 per cent combined water and arranged for free drainage, whereby the hydrated caustic soda liquefies upon taking up moisture from the fluid, and removing the liquefied caustic soda as it is formed to expose fresh surfaces of solid hydrated caustic soda to the fluid.

2. The process of claim 1 wherein the hydrated caustic soda corresponds substantially to the monohydrate NaOH.H₂O.

3. The process of claim 1 wherein the fluid is a gas, and the liquefied caustic soda flows downwardly.

4. The process of claim 1 wherein the fluid is carbon tetrachloride, and the liquefied caustic soda formed is displaced upwardly by the heavier tetrachloride.

5. The process of claim 1 wherein the solid hydrated caustic soda is in the form of balls.

6. A method of drying moist fluids which are inert chemically with respect to caustic soda, which comprises passing a flow of the fluid past extensive surfaces of solid hydrated caustic soda containing about 66 to 80 per cent NaOH and 34 to 20 per cent combined water and arranged for free liquid drainage past the surfaces, whereby the hydrated caustic soda liquefies upon taking up moisture from the fluid, and removing the liquefied caustic soda as it is formed, by gravitational action, to expose fresh surfaces of solid hydrated caustic soda to the flowing fluid.

7. A method of drying moist fluids which are inert chemically with respect to caustic alkalis, comprising passing a flow of the fluid past extensive surfaces of caustic alkali hydrated sufficently to have a melting point of 60° to 80° C. and arranged for free liquid drainage from the surfaces, whereby the hydrated caustic liquefies upon taking up moisture from the fluid, and removing the liquefied caustic alkali as it is formed to expose fresh surfaces of solid hydrated caustic alkali to the flowing fluid.

MAX Y. SEATON.